United States Patent [19]

Kawakami

[11] 4,441,934

[45] Apr. 10, 1984

[54] PROCESS AND APPARATUS FOR EXHAUSTING FUMES AND OXIDE PARTICLES GENERATED BY PLASMA-ARC CUTTING MACHINE

[75] Inventor: Masamichi Kawakami, Tokyo, Japan

[73] Assignee: Koike Sanso Kogyo Co., Ltd., Tokyo, Japan

[21] Appl. No.: 446,379

[22] Filed: Dec. 2, 1982

[30] Foreign Application Priority Data

Dec. 14, 1981 [JP] Japan .............................. 56-200051
Dec. 14, 1981 [JP] Japan .............................. 56-200052

[51] Int. Cl.³ .......................... B23K 7/00; B23K 7/02
[52] U.S. Cl. ...................................... 148/9 R; 266/49
[58] Field of Search ............................. 148/9; 266/49

[56] References Cited

U.S. PATENT DOCUMENTS

| | | | |
|---|---|---|---|
| 3,486,744 | 12/1969 | Beyers | 266/49 |
| 3,743,259 | 7/1973 | Hennelly | |
| 3,851,864 | 12/1974 | Miller | 266/65 |
| 4,143,860 | 3/1979 | Herbener et al. | 266/49 |

Primary Examiner—W. Stallard
Attorney, Agent, or Firm—Fleit, Jacobson, Cohn & Price

[57] ABSTRACT

A process and apparatus for absorbing and exhausting efficiently dust (oxide particles), fumes, smoke, harmful gases and the like generated by plasma-arc cutting. The lower space of a fixed board for supporting the material which is cut is divided by plural partition plates to the direction crossing at right angles with the driving direction of the cutting machine body, an absorbing hood connected with a dust collector through a duct is installed and fixed to the cutting machine body in order to exhaust from the side of partition space corresponding to the plasma-arc cutting torch, fumes in each partition space at every position of cutting at the shortest distance and efficiently by making the absorbing hood move together with the movement of the cutting machine body. A reduction of the dust collector's capacity and a simplification of the accessory equipment are possible and cost reduction of the equipment for exhausting smoke including dust, fumes and the like in the plasma-arc cutting machine is possible.

9 Claims, 12 Drawing Figures

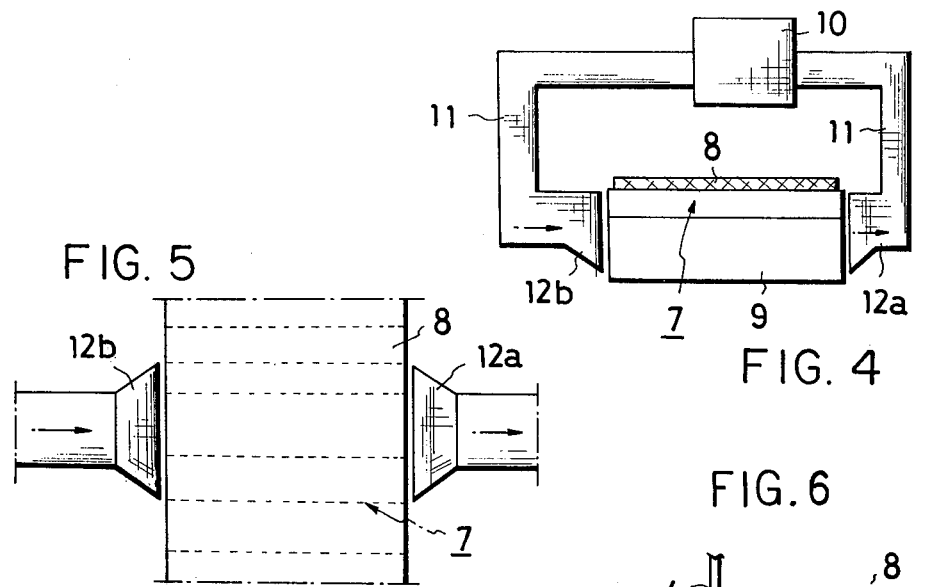
FIG. 5
FIG. 4
FIG. 6
FIG. 7
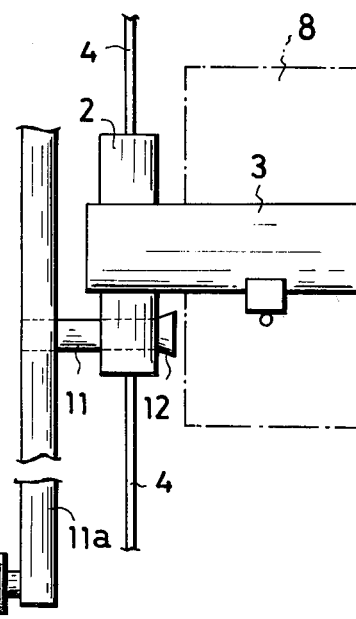
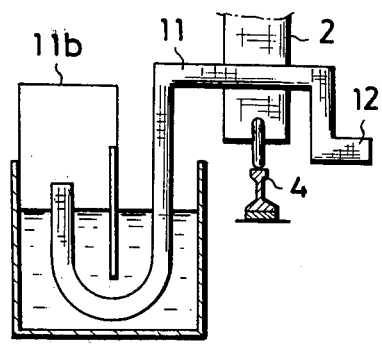
FIG. 8
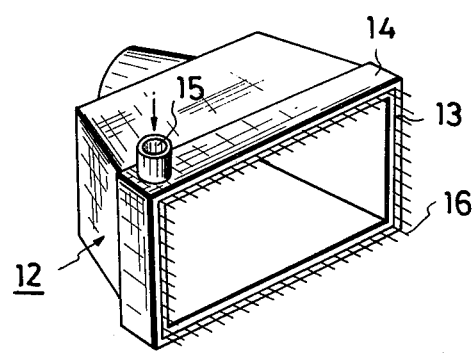

PROCESS AND APPARATUS FOR EXHAUSTING FUMES AND OXIDE PARTICLES GENERATED BY PLASMA-ARC CUTTING MACHINE

BACKGROUND OF THE INVENTION

The present invention relates to a process and an apparatus for exhausting fumes and oxide particles generated by a plasma-arc cutting machine.

Generally a flame cutting machine having many torches is used widely in order to cut steel plate to a desired shape, but recently the plasma-arc cutting machine tends to be used frequently for the sake of cutting speed and quality improvement of the product. In the flame cutting machine, cutting wastes in the forms consisting of comparatively small iron oxide and solidified molten metal are produced, the small oxide particles are in the form of sparks and generate an air contamination by turning said particles into dust and fumes. But especially in the plasma-arc cutting machine, fumes and harmful gases are generated together with a large quantity of dust and smoke, as compared with the flame cutting machine, the working environment is significantly deteriorated by surrounding air contamination, and the health of workers and other nearby persons can be harmed. An arrangement of apparatus for exhausting fumes in the plasma-arc cutting machine is indispensable. An enlargement of accessory facilities together with exhausting and treating apparatus for cutting slag and scrap impedes an improvement of productivity, and reduction of these accessory facilities is becoming a subject of great interest.

Heretofore, in the flame cutting machine and the plasma-arc cutting machine, dividing a fixed board for cutting into small chambers by many partition plates, arranging in succession a main duct in each small chamber through dampers and the like, which are capable of opening and shutting respectively, and opening the dampers in the neighborhood of the cutting torch, has been the method for exhausting fumes locally. In such a method, a long main duct over whole extent of the fixed board for cutting, and numerous dampers which are arranging in succession between the main duct and small chambers and the control mechanism for opening and shutting are required. The cost for accessory facilities involves massive expenditures, therefore there are defects which render difficult putting said method to practical use.

Also, U.S. Pat. Nos. 3,486,744 and 3,743,259 and the like are proposed as means for reducing air contamination which is produced from the flame cutting machine by use of a fluid.

In the former, a stream of water is supplied continuously to an inclined conduit which is arranged under the cutting torch, the oxide waste particles and the like which are generated in the cutting operation are entrained by this stream of water, and they are carried off to the precipitating pit. Since a considerable distance exists between the material being cut and a stream of pure water, the fumes of excess quantities and oxide particles run off and contaminate the atmosphere, and consequently an effect for exhausting fumes is not provided. The latter patent is an improvement of the former, and is so arranged that a spray-treating means for washing much more efficiently the environmental atmosphere of the cutting apparatus is equipped directly below the supporting table (fixed board for cutting) supporting the material which is cut. Air which is in existence downstream from the material being cut is saturated sufficiently and fumes and oxide which are generated during the cutting operation are filtered from the atmosphere.

Further, U.S. Pat. No. 3,851,864 is disclosed as the means which controls noises and fumes generated by the plasma-arc cutting but in this patent the material which is cut and an end of the torch nozzle are immersed in water, or a stream of water is supplied to a nozzle end and portions which is cut, and the cutting operation is carried out in the water. Consequently, the fumes are confined in the water and air contamination is reduced, but new problems for arrangement of drainage treating apparatus caused by water contamination arise. Also, there are defects which affect the quality aspect, including a deterioration of the roughness of the cutting surface and the accuracy of the cutting dimension and the like, as compared with the usual plasma-arc cutting (in the atmosphere).

At all events, in the above mentioned means for decreasing and controlling the atmospheric contamination which results from plasma-arc cutting by the use of a fluid, generally water, a large-scale foundation work consisting of inclined conduit, precipitating pit, large capacity water tank and the like and a water circulating apparatus by a pump are required for the circulating equipment for the water supply in the lower part of the fixed board for cutting (supporting table). Therefore that means requires a massive expenditure.

SUMMARY OF THE INVENTION

The present invention relates to a process and an apparatus for exhausting fumes in a plasma cutting machine, and more particularly to a process and an apparatus for carrying out said process, characterized in that, a carriage is arranged which is movable in a direction crossing at right angles with a rail on the cutting machine body and having construction work running on said rail. In the plasma cutting machine in which the cutting is carried out the upper part of the machine to be able to move the plasma cutting apparatus is mounted on said carriage, the lower part of a fixed board for cutting capable of supporting material which is cut is divided to the direction crossing at right angles with the driving direction of said cutting machine body, and a dust collector having a hood corresponding to the plasma cutting apparatus is installed and fixed to the cutting machine body. Exhausted fumes caused by the plasma cutting in every position of cutting are arranged to be absorbed efficiently at the shortest distance and from the limited spaces by partitions in a lateral direction.

The object of the present invention is to provide a process and an apparatus for exhausting fumes and oxide particles (dust, smoke) efficiently by installing the hood of a dust collector adjacent to the cutting machine body in order that the lower space of the fixed board for cutting may be divided by plural partition plates and is opposed with partition spaces confined during the cutting operation.

Another object of the present invention is to provide inexpensive accessory equipment for exhausting fumes by reducing the dust collector's capacity and simplifying the apparatus for exhausting fumes including a duct for exhausting fumes, smoke and the like by means of the enlargement of the effect for exhausting fumes caused by above-mentioned construction.

Still another object of the present invention is to provide the improved hood and duct for increasing absorption, heat resistance and a durability of the hood and the duct in the dust collector.

BRIEF DESCRIPTION OF THE DRAWINGS

FIG. 4 is a front view illustrating another embodiment of the present invention.

FIG. 5 is a plan view of FIG. 4.

FIG. 6 and FIG. 7 are a front view and a front sectional view illustrating still another embodiment of the present invention.

FIG. 8 and FIG. 9 are perspective views illustrating embodiments in which the hoods in accordance with the present invention are improved respectively.

DETAILED DESCRIPTION OF PREFERRED EMBODIMENTS

Figure 1:
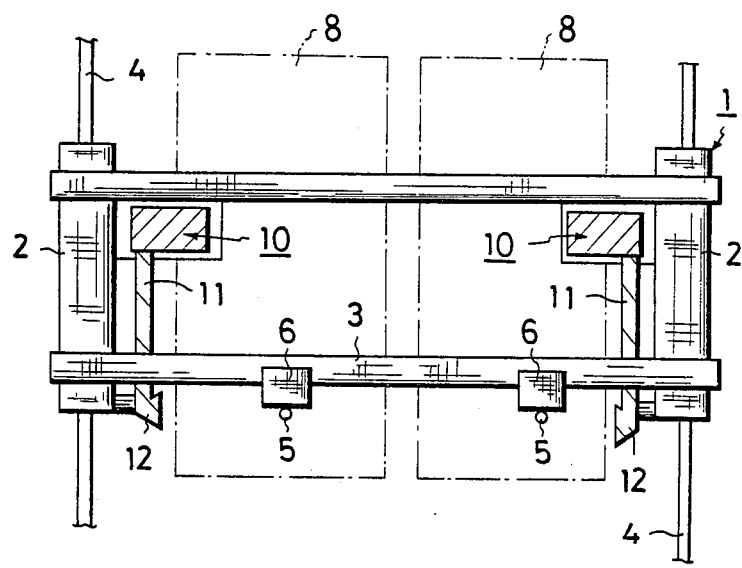
FIG. 1 is a plan view illustrating the construction of an embodiment of the present invention.

Referring now to the apparatus for carrying out the process of the present invention, in FIG. 1, reference numeral 1 is the plasma cutting machine body which is constituted by the saddle 2 and the construction work 3, two parallel rails 4 are constructed to permit the construction work 3 to travel in the longitudinal direction, the carriage 6 having the plasma cutting torch 5 is installed so as to be able to slide in the lateral direction along the construction work 3.

Figure 2:
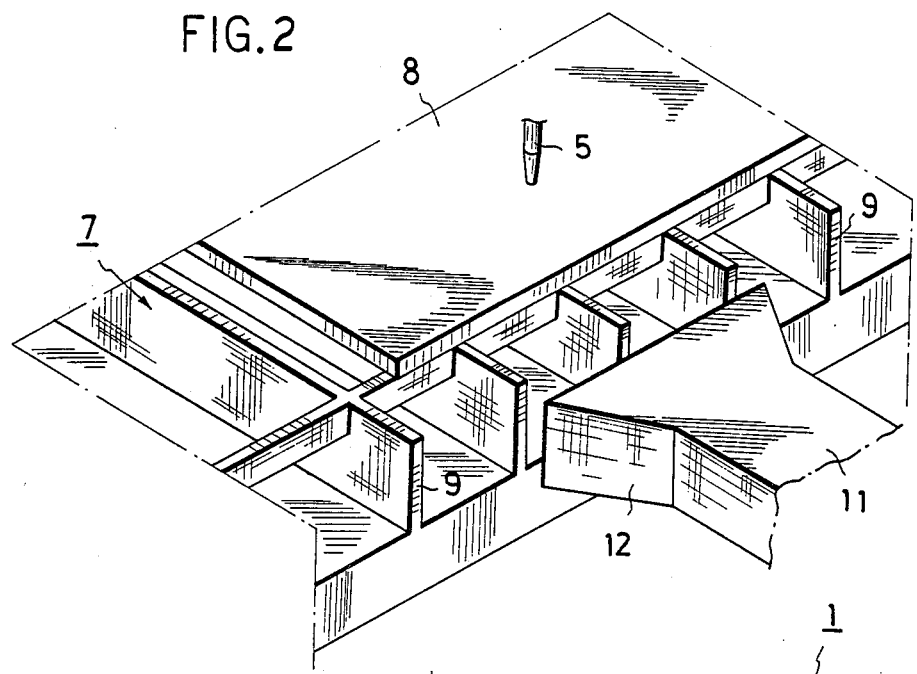
FIG. 2 is a perspective view illustrating a part of the principal part in an embodiment of the present invention.

Referring to FIG. 2, reference numeral 7 is the fixed board for cutting capable of supporting the material 8 which is cut, including steel plates and the like. In the lower space of this fixed board 7, several partition spaces are constituted by being juxtaposed in the lateral direction so as to cross at right angles with the rail 4 by maintaining several partition plates 9 with fixed space.

Referring to FIG. 1 once again, reference numeral 10 is a dust collector capable of absorbing and treating dust and fumes exhausted by the plasma cutting and is installed and fixed to said cutting machine body 1. Also, dust collector 10 is equipped with an absorbing hood 12 through the duct 11 for exhausting fumes, this hood 12 constituted so as to be able to move together with the dust collector 10; and the cutting machine body 1 along the side of said partition plates 9.

In the above-mentioned embodiment, two dust collectors 10 are used, but only one dust collector can be used, if desired.

Figure 3:
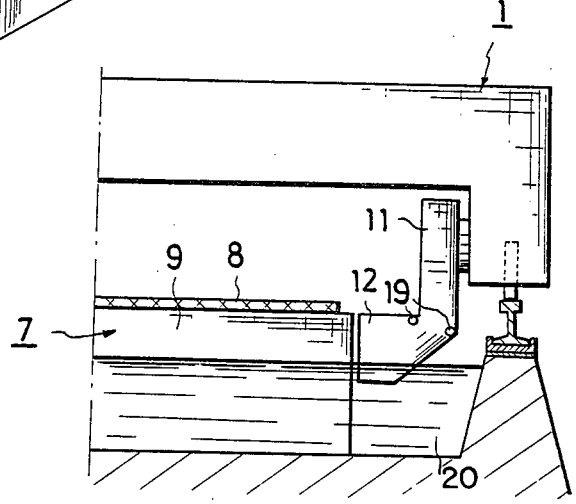
FIG. 3 is a front view in which a part is cut off illustrating another embodiment of the present invention.

Further, as shown in FIG. 3, the lower part of the fixed board 7 is received in a water tank 20, the lower parts of the partition plate 9 and the hood 12 arranged so as to immerse in the water of this water tank 20. Consequently an area of the lower space in the fixed board 7 is formed on a small scale and the sealing ability for exhausting fumes is enhanced, and therefore it may be possible to reduce the size of the apparatus for exhausting fumes.

When the water tank 20 is used as mentioned above, the dusts which are generated on the occasion of the plasma cutting are immersed in the water tank 20 and large particles in the fumes are removed, and therefore a rise in the atmospheric temperature within the hood is prevented, a decrease in dust and fumes becomes possible, the exhausting of the fumes is enhanced.

Also, as shown in FIG. 4 and FIG. 5, the one side corresponding to several lateral directional spaces which are formed by the partition plates 9 of the fixed board 7 for cutting is equipped with the absorbing hood and, the other side is equipped with the hood 12b capable of blowing out pure air discharged from the dust collector 10. The two hoods 12a and 12b are connected with the dust collector 10 as the central figure by the duct 11, and a stream or current of air for exhausting fumes is circulated forcedly, therefore the absorbing efficiency for exhausting the fumes is enhanced.

In the above-mentioned embodiment, the dust collector 10 is mounted on a part of the machine body 1 or is mounted on another truck falling into line with this machine body 1, but when the traveling distance of the machine body 1 is as short as 10-15 m, as shown in FIG. 6 and FIG. 7, the dust collector 10 is fixed at a place separated from the machine body 1. The dust collector 10 communicates with the hood 12 by using a flexible movable duct 11a which at a point opening of the duct 11 is connected to a movable covering belt, or it may be possible that the point opening of the duct 11 is formed in the form of a U-letter and the part of said duct communicates with the dust collector 10 and the hood 12 by using the water sealing movable duct 11b installed movably within the water tank.

Furthermore, as shown in FIG. 8, surrounding outer portion of the hood 12 is equipped with a chamber 14 having a slit 13, and the air supply port 15 is connected with this chamber 14, whereby air flows out from the slit 13 of the chamber 14 along the outer surrounding edge of the hood 12, and an air curtain 16 is formed. Therefore outside air is intercepted and an engulfing of air from the circumference is prevented, exhausting and absorbing of fumes in the duct is enhanced remarkably.

Figure 9:
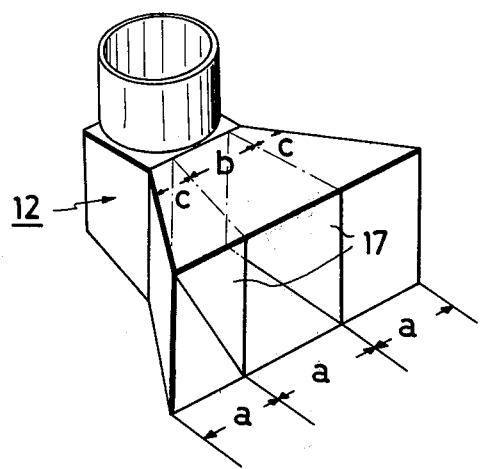

Also, in the inside of the absorbing port of hood 12, as shown in FIG. 9, a space coinciding nearly with the mutual space of the partition plates 9 of fixed board 7 is maintained and several partition plates 17 of the absorbing port are installed vertically. Consequently, the absorbing effect of the partition space of the central partition can be always enhanced over that of the side spaces. Namely, in the drawing, three spaces 'a' in the inlet portion are equal to each other, but a relationship of $b < C$ is formed in the interior, and the absorbing effect can be enhanced remarkably by increasing the amount of flowing air in the central portion relative to both side portions.

Figure 10:
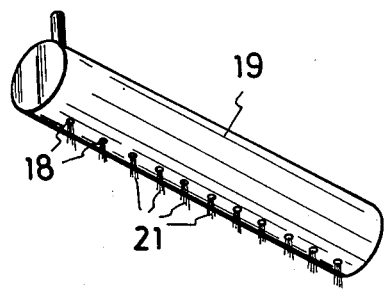
FIG. 10 is a perspective view of a sprinkling pipe installed within the hood of the present invention.

FIG. 3 and FIG. 10 are the drawings showing a sprinkling pipe 19 having the numerous nozzles 18 installed on the upper part of the absorbing port within the hood 12. The water tank 20 is formed around the fixed board 7, and the water curtain 21 is formed by sprinkling from the sprinkling pipe 19 consequently, which have large dust particles are mixed with the exhausted fumes and are dropped by this curtain 21, while the exhausted fumes which are at a high temperature are cooled by passing through this curtain 21, and therefore damage resulting from the high temperature in the hood 12, the duct 11 and the dust collector 10 can be prevented.

Figure 11:
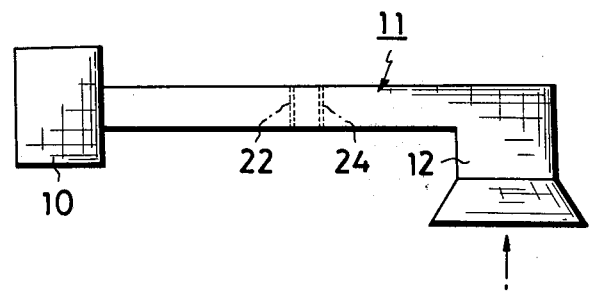
FIG. 11 and FIG. 12 are a simple plan view and a fragmentary vertical sectional view for illustrating a dust smashing wall arranged on the way of the duct of the present invention.
Figure 12:
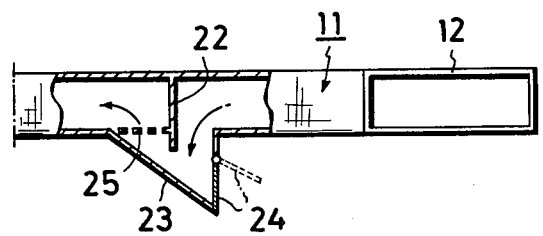

In FIG. 11 and FIG. 12, a dust impingement wall is provided in the middle of the duct 11, the duct is equipped vertically with an impingement plate 22 at the inside, and the cover 23 is communicate with the duct 11 in the lower part of this impingement plate 22 and is projected and formed to the lower surface, of the duct 11 a portion of this cover 23 is equipped with a lid 24 for removing dust so as to open or shut freely. Furthermore, a part of the duct 11 by the cover 23 is equipped with a wire netting 25 for preventing the passage of dust.

In the method in accordance with the present invention, as mentioned above, the dust collector for exhausting and treating fumes is mounted on the cutting machine body or is arranged at a separated place. The partition spaces are constituted by dividing the lower part of fixed board with several blocks by the partition plates. The absorbing hood is installed slidably on the side of the partition spaces, said absorbing hood connected with said dust collector, and the exhausted fumes within each partition space are absorbed and treated by making the absorbing hood move together with the movement of the cutting machine body. Therefore a long main duct over whole range of the fixed board a damper for arranging each small chamber in succession and the control mechanism for opening or shutting and the like are unnecessary. Also a large scale of accessory equipment including a spray treating apparatus by fluid, mainly water, an inclined tub in the lower part of supporting table, a precipitating pit, a large volume water tank and the like are unnecessary. Consequently this method has the characteristic that it permits reducing the size of the equipment as well as accessory equipment, and the apparatus for exhausting fumes by reducing the dust collector's capacity and the simplification of the passage for exhausting fumes.

Further, the surrounding outside air is cut off by forming an air curtain and an engulfing from the circumference is prevented, and then the absorbing effect for exhausting fumes can be enhanced. The partition is arranged in the hood or duct, or the water curtain is formed by sprinkling from a sprinkling pipe. Furthermore this method improves the absorbing efficiency of the hood's central portion by installing the impingement plate, and the dusts which have large particles and are mixed with the exhausted fumes are dropped by this water curtain and the exhausted fumes having high a temperature are cooled, and therefore damage to the hood, the duct and the dust collector can be prevented.

What is claimed is:

1. In a method for exhausting fumes in a plasma cutting machine which includes a movable carriage crossing at right angles to the direction of a rail laid in parallel to the construction work of the cutting machine body running on said rail, and carries out cutting by making the upper part of the machine to be able to move the plasma cutting apparatus mounted on said carriage, said method characterized in that the lower part of a fixed board for cutting capable of supporting the material which is cut is divided relative to the direction crossing at right angles with the driving direction of said cutting machine body, and a dust collector having a hood corresponding to the plasma cutting apparatus is installed and fixed to the cutting machine body, exhausted fumes caused by the plasma cutting in every position of cutting arranged to be absorbed efficiently at the shortest distance and from the limited spaces by partitions in a lateral direction.

2. In an apparatus for exhausting fumes in a plasma cutting machine comprising a cutting machine body running on a rail laid in parallel, the carriage running in a direction crossing at right angles with the rail on said cutting machine body, and the plasma cutting apparatus mounted on the carriage, said apparatus characterized in that a hood capable of absorbing dust, fumes, harmful gases and the like which are generated on the occasion of cutting is installed and fixed to said cutting machine body.

3. An apparatus for exhausting fumes in the plasma cutting machine as claimed in claim 2, characterized in that a fixed board for cutting is provided and the lower part of the fixed board for cutting is immersed and constituted in a water tank and the lower space of the fixed board for cutting is partitioned laterally by several partition plates.

4. An apparatus for exhausting fumes in the plasma cutting machine as claimed in claim 2 or claim 3, characterized in that an absorbing hood is arranged adjacent to a lateral smoke duct formed in the lower part of the fixed board for cutting by the partition plates on the one side as well as a second hood capable of blowing out pure air discharged by the dust collector, and said two hoods are connected with the duct collector the duct.

5. An apparatus for exhausting fumes in the plasma cutting machine in claim 2, characterized in that an absorbing hood fixed to the cutting machine body communicates with the dust collector arranged separately with the cutting machine body through a flexible duct.

6. An apparatus for exhausting fumes in the plasma cutting machine as claimed in claim 2, characterized in that an absorbing hood with chambers having slits capable of blowing out compressed air are installed in the outer circumference of the inlet and are installed and fixed to said cutting machine body.

7. An apparatus for exhausting fumes in the plasma cutting machine as claimed in claim 2, claim 5, or claim 6, characterized in that an absorbing hood with sprinklers capable of forming a water curtain by sprinkling are fixed to the cutting machine body.

8. An apparatus for exhausting fumes in the plasma cutting machine as claimed in claim 2, claim 5, or claim 6 to claim 7, characterized in that absorbing hoods having inside spaces are partitioned into several pieces by installing vertically several partition plates inside are installed and fixed to said cutting body.

9. An apparatus for exhausting fumes in the plasma cutting machine as claimed in claim 2, claim 5, or claim 6, characterized in that said machine includes absorbing hoods capable of absorbing the exhausted fumes and are installed and fixed to the cutting machine body, and dust impingement walls are installed vertically within ducts which are connected with the inside of said absorbing hoods.

* * * * *